United States Patent [19]

Ito et al.

[11] Patent Number: 4,858,746
[45] Date of Patent: Aug. 22, 1989

[54] METHOD AND APPARATUS FOR TRANSPORTING ARTICLES

[75] Inventors: Shunji Ito, Nagoya; Kanehiro Ito, Aichi; Takashi Kogiso, Mizunami; Yoshio Kurachi, Aichi, all of Japan

[73] Assignee: Howa Machinery, Ltd., Aichi, Japan

[21] Appl. No.: 137,253

[22] Filed: Dec. 23, 1987

[30] Foreign Application Priority Data

Dec. 27, 1986 [JP] Japan .................... 61-311180
Jan. 17, 1987 [JP] Japan .................... 62-8613

[51] Int. Cl.⁴ ............................. B65G 37/00
[52] U.S. Cl. .................... 198/465.4; 414/331; 242/35
[58] Field of Search .......... 198/465.4; 414/331; 242/35 R, 79

[56] References Cited

U.S. PATENT DOCUMENTS

| | | | |
|---|---|---|---|
| 1,599,227 | 9/1926 | Gantvoort | 414/331 |
| 4,368,001 | 1/1983 | Larraroli | 414/331 |
| 4,558,830 | 12/1985 | Larsson | 242/54 R |
| 4,722,657 | 2/1988 | Grube | 414/331 |

FOREIGN PATENT DOCUMENTS

| | | | |
|---|---|---|---|
| 0109000 | 5/1984 | European Pat. Off. | |
| 3334977 | 4/1984 | Fed. Rep. of Germany | |
| 3442161 | 5/1985 | Fed. Rep. of Germany | 414/331 |
| 3616880 | 11/1986 | Fed. Rep. of Germany | |
| 2240636 | 3/1975 | France | |
| 0183402 | 9/1985 | Japan | 414/331 |
| 1532030 | 11/1978 | United Kingdom | |

*Primary Examiner*—Robert J. Spar
*Assistant Examiner*—James R. Bidwell
*Attorney, Agent, or Firm*—Michael N. Meller

[57] ABSTRACT

A method for transporting articles in a system for transferring such articles between different machines provided on different floors of a building, wherein a predetermined number of articles are taken from a machine, the articles being hung in rows on a carrying unit moving along a guide rail, taking the articles to a lift, storing the articles in the lift while the articles are still hanging on the carrying unit, transferring the articles to another floor, withdrawing the articles from the lift while still hanging on the carrying unit, moving the carrying unit on a guide rail, and taking the articles to another machine by moving the carrying unit along the guide rail.

33 Claims, 23 Drawing Sheets

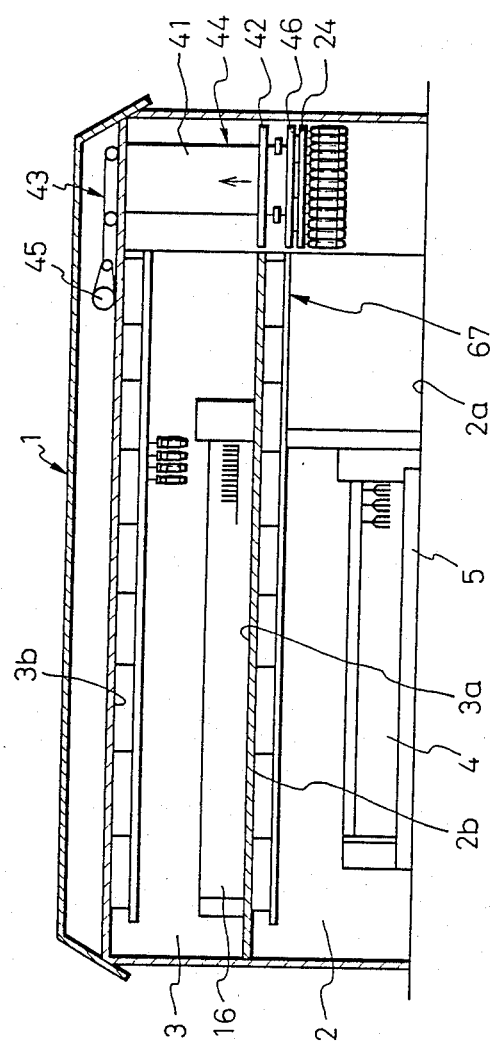

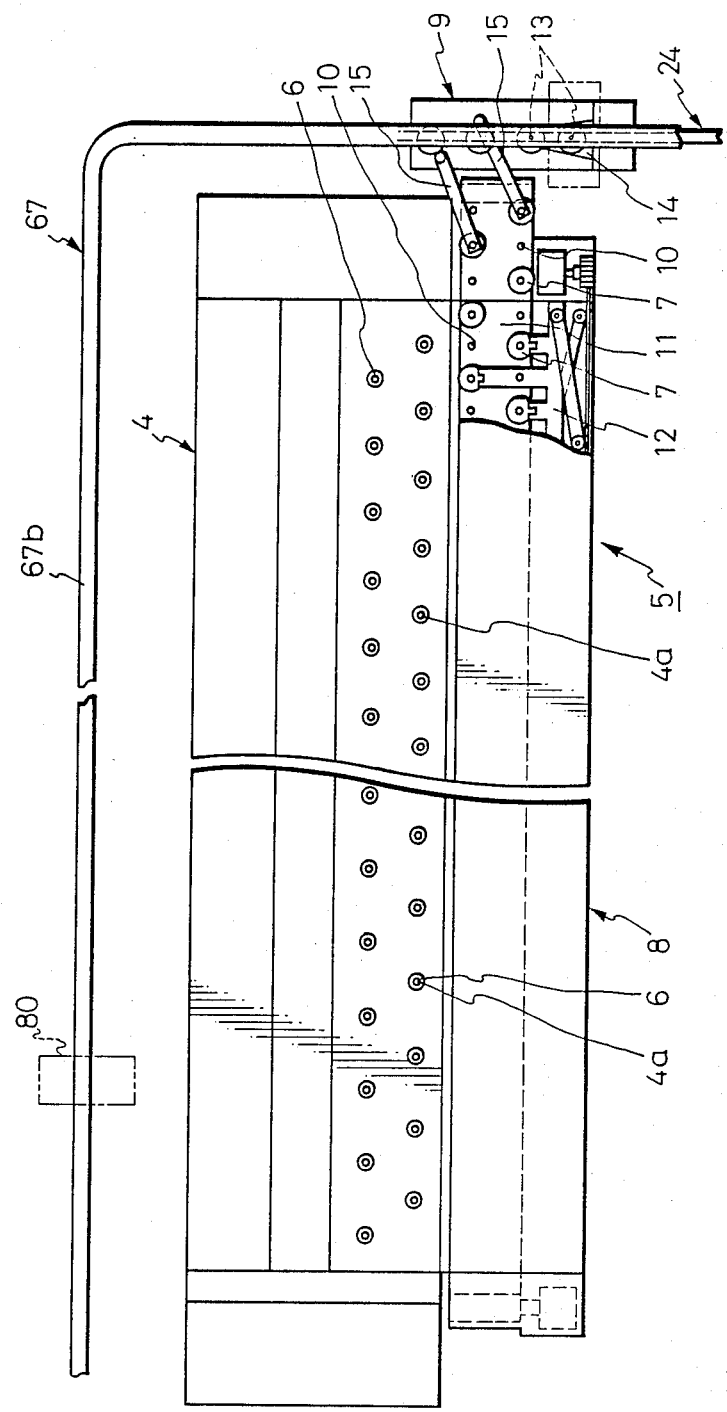

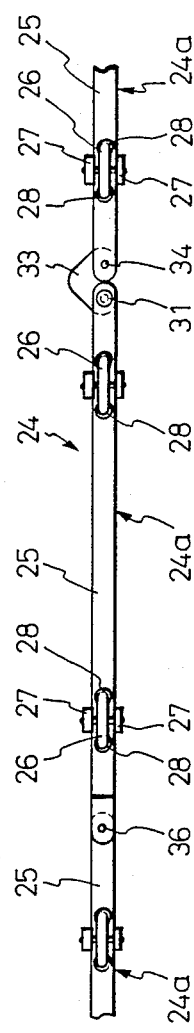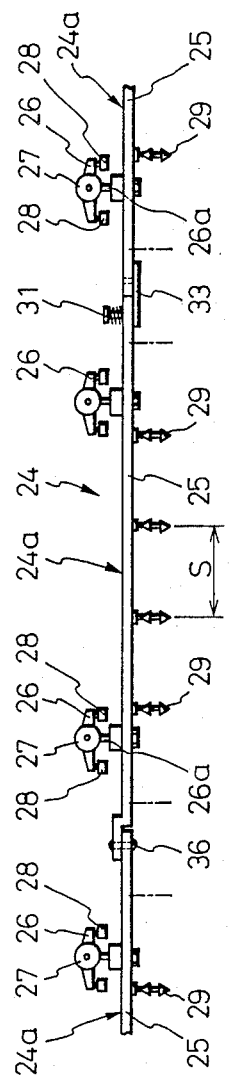

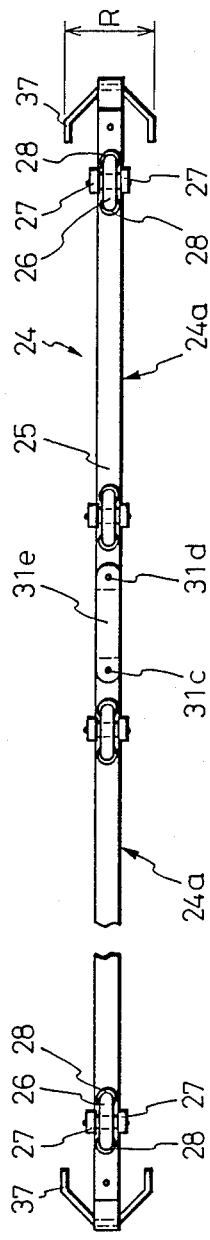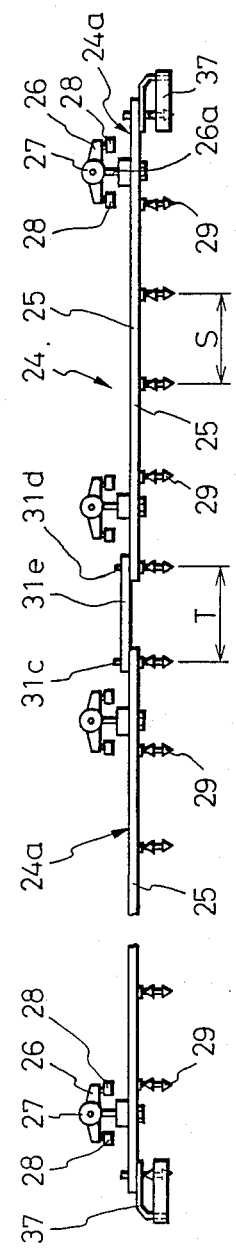
Fig.8
Fig.9

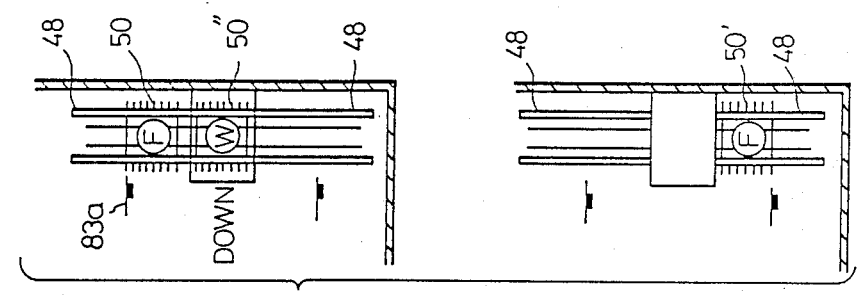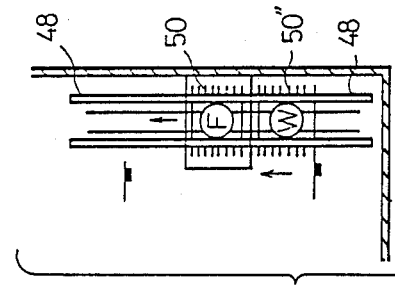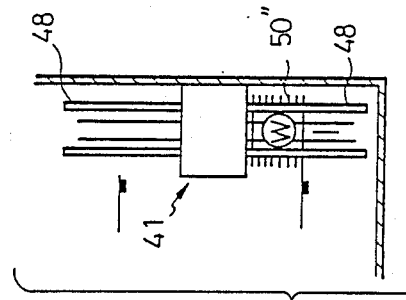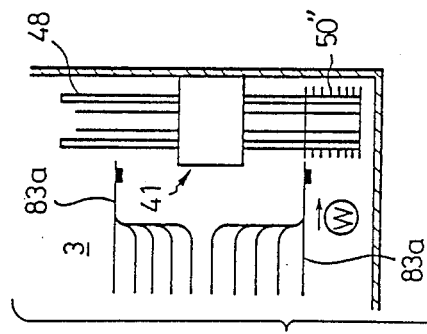

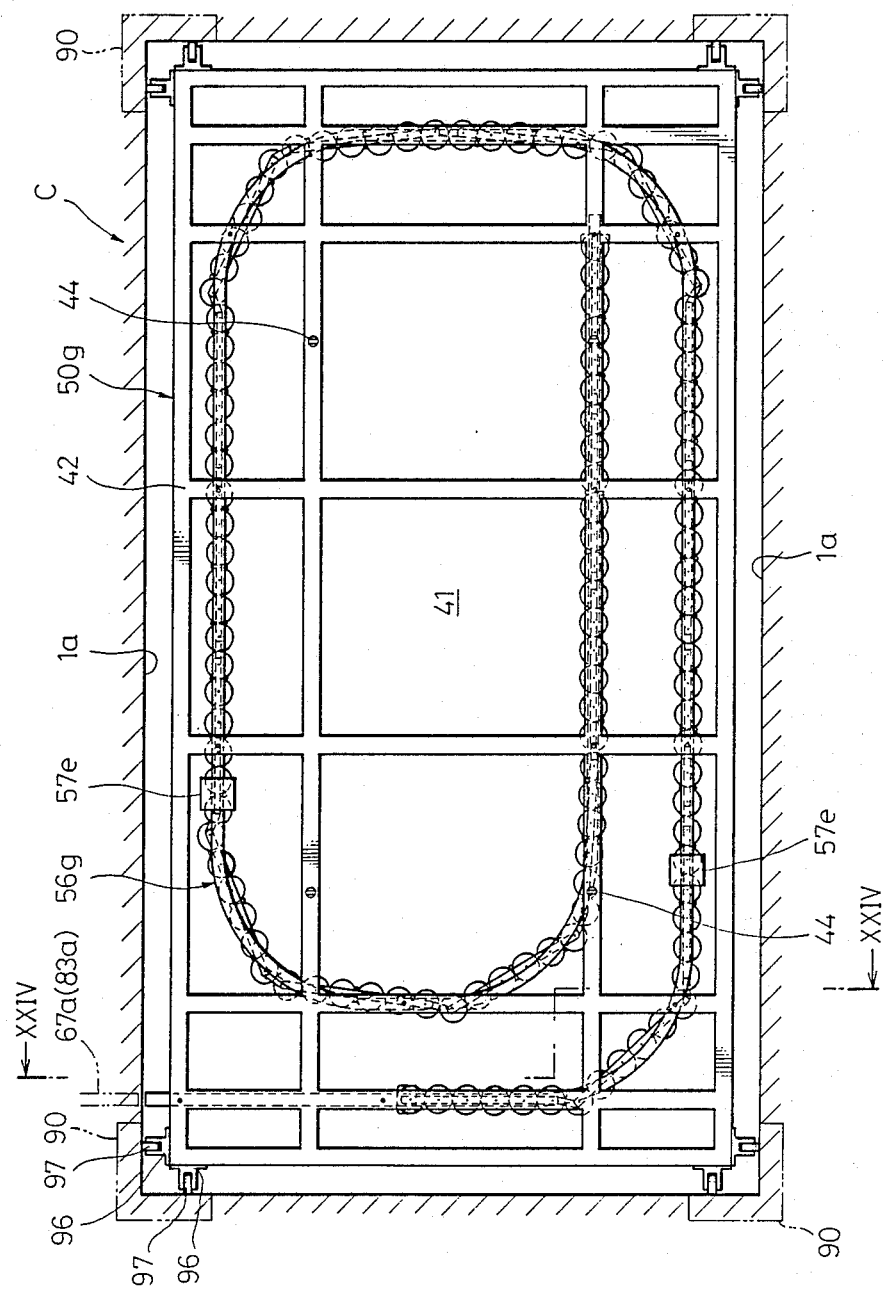

METHOD AND APPARATUS FOR TRANSPORTING ARTICLES

BACKGROUND OF THE INVENTION

1. Field of the Invention

This invention is related to a method for transporting articles in a system for transferring such articles between machines situated on different floors of a building, and an apparatus therefor.

More specifically, it is related to a method for transferring bobbins between a roving machine and a spinning machine situated on different floors of a building.

2. Description of the Related Art

Methods of manufacturing many identical products at the same time on a machine and subjecting the products to the same treatment simultaneously after transfer to another machine are used in various industries, such as the textile industry, the electric or electronic industry, and the food industry, for example.

However, many difficulties arise in the transfer of articles such as, for example, a materials, intermediate products, and final products, and particularly when the machinery is situated on different floors in a factory, the system for transferring the materials and products becomes very complex. Accordingly, there is a strong demand for a simpler, more reliable and more effective system.

The above problems will be explained in more detail hereafter, using the textile industry as an example.

In the conventional system of processing textiles, roving bobbins doffed from a roving machine are stored inside a storage box provided on a carrying cart, and the cart is moved to a position in front of an elevator. The cart is then taken to another floor of the building by the elevator, where, for example, a spinning machine is situated, and moved to a required position at the spinning machine. The roving bobbins are then taken out of the storage box and hung on bobbin hangers. Also, empty bobbins removed at the end of a spinning operation of a spinning machine are stored in the storage box of a carrying cart and transferred to a roving machine.

However, when the roving bobbins are carried in the storage box of a carrying cart, a problem arises in that the bobbins are damaged because of a mutual abrasive movement between the bobbins or abrasion between a bobbin and inside surface of the storage box during while the bobbins are stored in the storage box.

To overcome this problem, Japanese Examined Patent Publication No. 54-44786 disclosed a carrying cart having a pair of movable endless chains with a plurality of horizontal supporting beams swingably mounted thereon, and the roving bobbins are held on the beams by inserting the bobbins vertically into the beams.

However this method, the need for a complicated device such as an endless chain in the carrying cart increases the transfer costs, and many problems remain because it is labor- and cost-consuming to transfer the carrying cart to a spinning machine and to hang the roving bobbins on a bobbin hanger at the spinning machine.

SUMMARY OF THE INVENTION

Accordingly, an object of the present invention is to provide a material handling system applicable to many industries, including the textile industry, by overcoming the problems mentioned above. This object of the invention is realized by the system and apparatus described below.

Namely, this invention provides a method for transporting articles in a system for transferring such articles between machines situated on different floors of a building, wherein the method is characterized by taking a predetermined number of articles, from a machine on one floor, hanging the articles in a series of rows on a carrying means having a predetermined length, and moving the carrying means onto a guide rail provided in the proximity of the machine, taking the articles to a lifting means by moving the carrying means along the guide rail, storing the articles in the lifting means in such a way that at least of a portion of the carrying means is arranged with at least a portion of the rest of the carrying means in a side by side configuration while the articles are still hanging in the carrying means, transferring the articles to another floor of the building, withdrawing the articles from the lifting means in a series of rows while the articles are still hanging on the carrying means, moving the carrying means onto a guide rail, and taking the articles to another machine by moving the carrying means along the guide rail.

In this invention, the term "different floors" denotes at least two floors in a factory, for example, the first floor and the second floor, the second floor and the third floor, or the first floor and the third floor, and so on, and the phrase "different machinery provided on each different florr" means that a machine provided on one floor is different from a machine provided on another floor as far as machine construction and/or function thereof are concerned.

In the textile industry, this may denote a roving machine and a spinning machine, a drawing machine and a false twisting machine, or a drawing machine and a twisting machine, for example.

The term "articles" as used in this specification can denote intermediate products, final products produced or treated by a machine, or supporting goods for producing or treating such products by a machine. In the textile industry, this may include roving bobbins, spinning bobbins, pirns, cones, drums, cheeses and empty bobbins.

Further, in this invention, the articles are not transferred between the machines one by one, but are transferred as lots.

This invention is characterized in that a carrying means for taking the articles from a machine and transferring them to, and sometimes supplying them to the necessary portions of, another machine, a guide rail provided in the proximity of the machines mounted on each floor for moving the carrying means, and a lifting means moving between different floors and lifting and lowering the articles to different floors, are provided, and further characterized in that the carrying means holding the articles in a hanging condition thereon in a series of rows is transferred while the articles are still in a hanging condition by moving along a guide rail, is stored compactly inside of the lifting means having a narrow space therein while the articles are still in hanging condition, and is thereafter transferred to another floor, and finally guided to the other machinery along a guide rail while the articles are still in a hanging condition. Namely, in this invention, the articles can be transferred more efficiently and with the use of less space, without damage to the articles, by not using the conventional storage boxes, storage racks, and storage cans.

Furthermore, although there are many disclosures of configurations of the carrying means to be stored in a lifting means, in this invention the articles to be stored in the lifting means must be kept in the vertical condition as much as possible, to avoiding contact between the articles and the inside wall of a lifting means.

Accordingly, in the present invention the articles are transferred by a carrying means having a predetermined length in a form of a straight line or the like along a guide rail, but when placed inside of the lifting means, at least a portion of the carrying means having a predetermined length is arranged with at least a portion of the rest of the carrying means in a side by side configuration; i.e., these portions are arranged adjacent to each other in the same horizontal plane.

This side by side configuration enables not only a compact storage of the carrying means inside of the lifting means, i.e., in a coiled or folded configuration, but also a method of storage in which a plurality of element portions of the carrying means obtained by dividing the carrying means into sections, are stored inside of the storage in parallel. The storage means used in this invention has a longitudinally extended configuration and a plurality of bobbin hanging means thereon. Also, the carrying means has a predetermined length sufficient to enable a predetermined number of articles needed by a machine to be carried thereto.

Further, the carrying means as mentioned above consists of a plurality of the element portions shorter in length than the carrying means, and each element portion is coupled to another element portion at each end thereof by a removable and pivotable means, and is preferably moved by a driving means along a guide rail and a rail provided inside of a lifting means.

The lifting means of this invention is provided with a lifting body connected to a cable moved by a lifting motor and a magazine having a storing rail therein for receiving the carrying means from a guide rail.

In this invention, the magazine may be an integral part of the lifting body or may be slidably mounted on the lifting body so that it can be moved by a suitable means in at least one horizontal direction, preferably in two opposite directions, out of the lifting means when the lifting means is stopped at each floor.

Note, although this invention includes the case in which the magazine may not be moved out of the lifting means, preferably the magazine can be moved out of the lifting means from a productivity point of view.

Preferably, in this invention, a position of at least one end of a guide rail provided on each florr corresponds to a position of at least one end of a storing rail of the magazine when the magazine moves out of the lifting means after the lifting means is stopped at each floor. Also, preferably two guide rails located in the vicinity of the lifting means are provided in correspondence to the position of a magazine in the lifting means when the magazine can move in two directions.

According to the basic construction in this invention as described above, when transferring the articles by the lifting means, an operation of carrying articles X away from the magazine and an operation of carrying other articles Y therein, and an operation of carrying the other articles Y away from the magazine and an operation of carrying the articles X therein, are respectively carried out simultaneously and/or in sequence on each floor, by a suitable program. Also, each operation as mentioned above, will be carried out simultaneously and/or in sequence, by a suitable program, on each floor.

In the operation of this invention, preferably the number of the magazines in a lifting means corresponds to the number of the floor incremented by 1; i.e., three magazines are used when the floor number is two, for example.

The implementation of this invention may be carried out sequentially under the control of a suitable programs, taking into consideration the duration of each operation of the means used in this system.

A detailed description of this invention will be described hereafter, in which this invention is applied to a system using a roving machine and a spinning machine in the textile industry as an example. Note, this invention is not restricted to this example.

BRIEF DESCRIPTION OF THE DRAWINGS

FIG. 1 is a vertical cross sectional view of a spinning factory;

FIG. 3 is an enlarged plane view of a roving machine;

FIG. 6 is a plane view of a bobbin carrying means;

FIG. 7 is a side view of the carrying means;

FIG. 8 is a plane view of another embodiment of the carrying means;

FIG. 9 is a side view of the carrying means of FIG. 8;

FIG. 23 is a plane view of another embodiment of the lifting means shown in FIG. 14; and, FIG. 24 is a cross sectional view of FIG. 23.

DESCRIPTION OF THE PREFERRED EMBODIMENTS

In FIG. 1, a spinning factory building 1 consists of a first floor 2 and a second floor 3 and a lifting means 41 according to this invention is provided in the building 1.

The bobbins used in this embodiment consist of two different kinds of bobbins, i.e., a full bobbin in which a roving yarn has been wound on an empty bobbin and an empty bobbin in which a roving yarn has not been wound thereon.

Figure 2A:
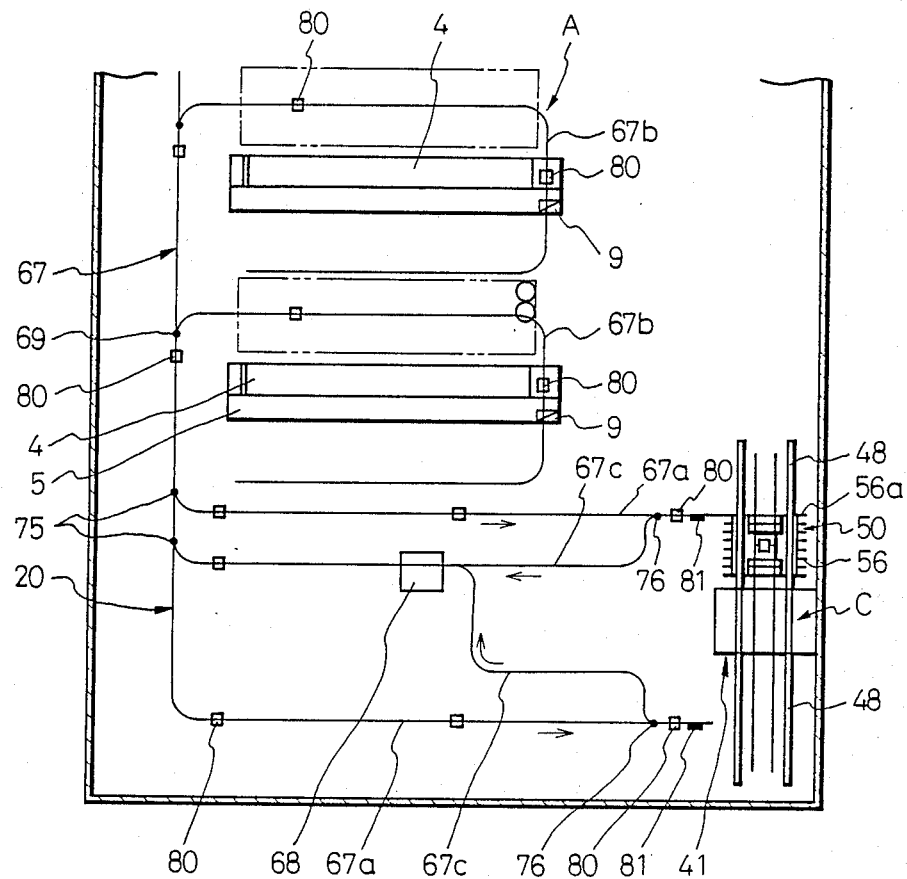
FIG. 2A and 2B are schematic plane views of a floor provided with a roving machine.
Figure 2B:
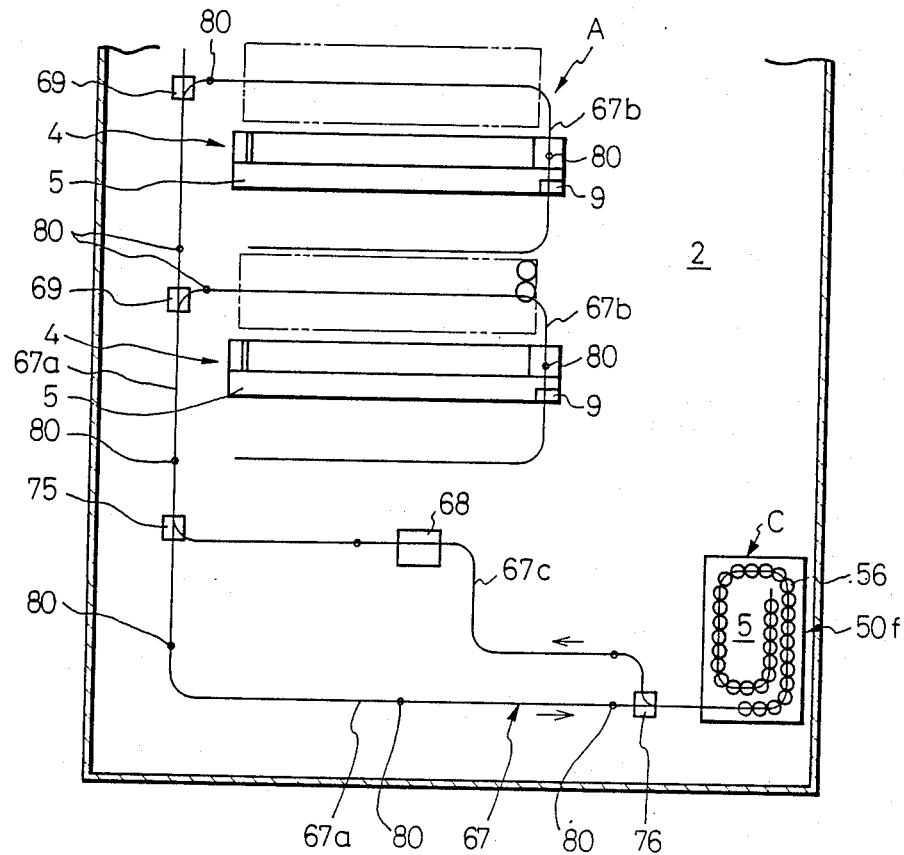

A plurality of known roving machines 4 is provided on the ground surface 2a of the first floor 2 and these roving machines 4 are arranged in parallel as shown in FIGS. 2A and 2B. An automatic bobbin changer 5 is provided in front of each roving machine 4, as shown in FIG. 3, which can exchange empty bobbins 6 hung on the carrying means with full bobbins 7 mounted on a bobbin wheel 4a.

This automatic bobbin changer 5 may be provided with the simultaneous bobbin changer 8 described in Japanese Unexamined Patent Publication 57-106729 and a bobbin transferring means 9 described in Japanese Unexamined Patent Publication No. 58-41919. The simultaneous bobbin changer 8 is provided with a belt conveyor 11 having a plurality of pegs 10 thereon, as shown in FIG. 3, and the full bobbins 7 mounted on the bobbin wheel 4a can be transferred onto the pegs 10. On the other hand, the empty bobbins 6 mounted on different pegs 10 can be transferred onto the bobbin wheel 4a by an up and down movement and/or a back and forth movement of the conveyor 11 and a bobbin exchanging head 12 of the simultaneous bobbin changer 8. FIG. 3 shows the situation in which all of the empty bobbins 6 are mounted on the bobbin wheels 4a and all of the full bobbins 7 are mounted on the pegs 10.

The bobbin transferring means 9 is provided with a lifting plate 14 having pegs 13 and exchanging arms 15, and the operation thereof is such that the empty bobbin 6 hung on the carrying means (described later) is taken therefrom and placed on the peg 13 by an up and down movement of the lifting plate 14, and thereafter, the empty bobbin mounted on the peg 13 is mounted on the peg 10 by a transferring movement of the exchanging arms 15, while the full bobbin 7 on the peg 10 is mounted on the peg 13 by a transferring movement of the exchanging arms 15, and thereafter is hung on the bobbin hanging means (described later) of the carrying means by an up and down movement of the lifting plate 14.

Figure 4A:
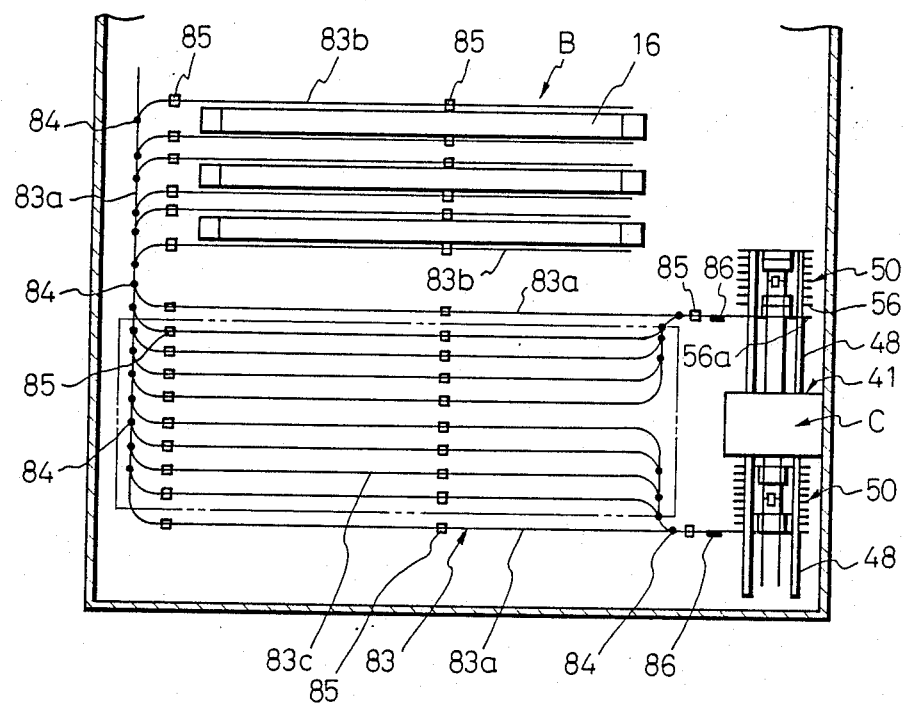
FIG. 4A an 4B are schematic plane views of a floor provided with a spinning machine.
Figure 4B:
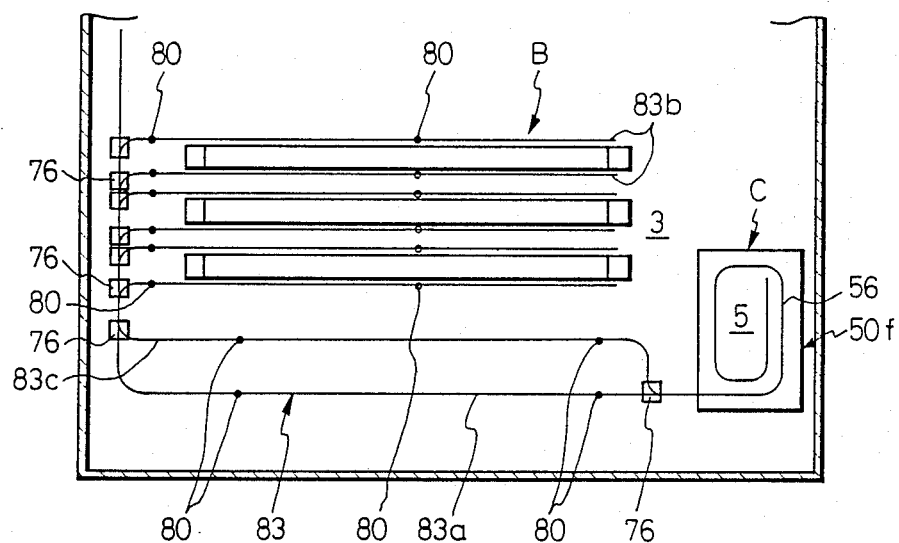
Figure 5:
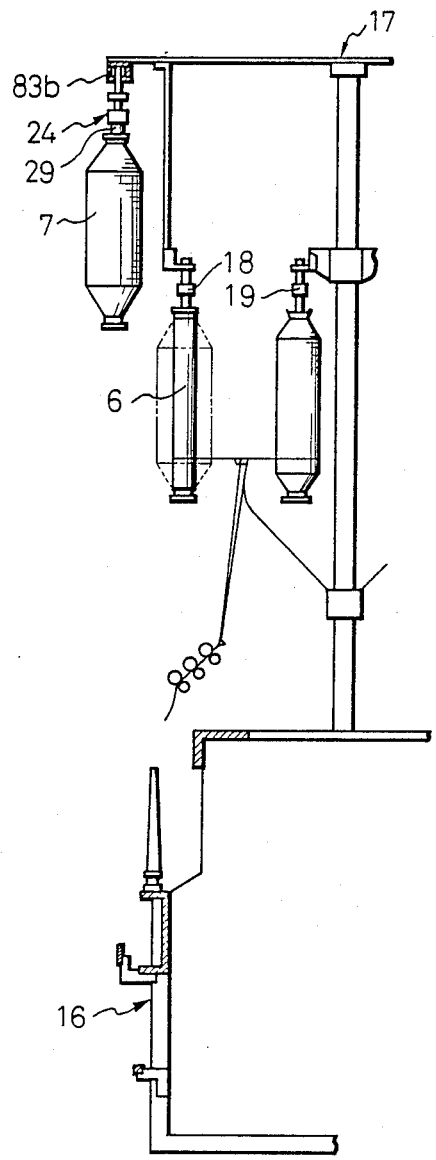
FIG. 5 is an enlarged cross sectional view of a spinning machine.
Figure 10:
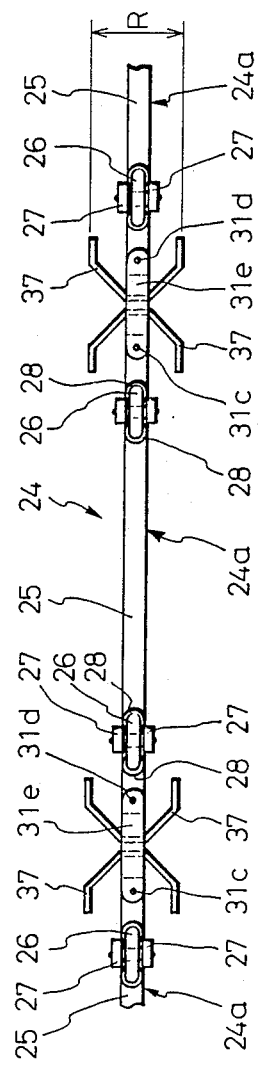
FIG. 10 is a plane view of another embodiment of a carrying means.

The bobbin hanging means of the carrying means (called bobbin hanger hereafter) of this invention is preferably freely pivotable and has a mechanism such that a bobbin can be coupled with and removed from the bobbin hanger by lifting upwardly from the bottom of the hanger. However, in place of this automatic bobbin changer 5, another bobbin changer as described in Japanese Examined Patent Publication No. 51-38814 or an ordinary method for changing bobbins by hand can be used. A plurality of known spinning machines 16 is provided on the ground surface 3a of the second floor 3 and these spinning machines 16 are arranged in parallel as shown in FIGS. 4A and 4B. As shown in FIG. 5, a creel 17 having a front bobbin hanger 18 and a back bobbin hanger 19 are provided on the spinning machine 16 and the roving bobbins are hung on both bobbin hangers 18 and 19.

Next, a guide rail 67 is provided to enable the bobbin carrying means 24 to be moved between the roving machines 4 and the spinning machines 16 in such a way that the full bobbins doffed at the position A of a roving machine 4 are transferred to the position B of a spinning machine 16, and the empty bobbins at the position B of the spinning machine 16 are transferred to the position A of the roving machine 4.

The bobbin carrying means 24 is provided for holding the empty bobbins 6 and the full bobbins 7 in a hanging condition, and consists of a plurality of element portions 24a each of which is coupled to another element portion 24a to form a series of these elements 24a in a line, as shown in FIGS. 6 and 7.

Each element portion 24a consists of a rod-like bar portion 25, to act as a carriage bar, having a pair of supporting rods 26 projecting from an upper surface thereof and a supporting body 26 movably mounted on the supporting rod 26a and provided with a pair of a left and right supporting rollers 27 and a pair of the front and back guiding rollers 28 movably mounted thereon. Further, on the upper surface of the carriage bar 25, proximity bodies described later but not shown in Figures are provided at every two pitches of the bobbin hangers. On the other hand, six known bobbin hangers 29 are provided on the undersurface of the each of the carriage bars 25, spaced at a predetermined distance.

The distance S of the bobbin hangers 29 is twice the spindle pitch of a spinning machine 16. A square hole 30 is provided on the edge of each carriage bar 25 arranged alternately in a row, and a square pin 31 which moves up and down is slidably connected thereto. The square pin 31 is biased upward by a spring 32 provided between the carriage bar 25 and a stopping collar 31a, and is provided with a triangular connecting piece 33 on the bottom end thereof. A connecting pin 34 is projected from the upper surface of the connecting piece 33 and is removably coupled with a connecting aperture 35 provided at the end of an adjacent carriage bar 25, so that all of the element portions 24a of the carrying means 24 can be removably connected.

Further, as shown in FIGS. 6 and 7, connected portion of the carriage bars 25 other than that of the portion connected with the connecting piece 33 are also removably connected by a pin 36.

The carrying means 24 described above is very convenient in use in that each element portion 24a can be stored separately inside a magazine.

Note, in other embodiments in which the carrying means 24 is stored in a magazine in a coiled or folded configuration, the carrying means 24 having a construction shown in FIGS. 8 and 9 is preferably used.

The carrying means shown in FIGS. 8 and 9 has the same construction as that of shown in FIGS. 6 and 7, except for the following points.

Namely, a connecting piece 31e is provided for removably connecting the two adjacent carriage bars 25 with pins 31c and 31d respectively. Each pin 31c and 31d is positioned at a place correspoding to the position of the endmost bobbin hanger 29 on the carriage bar 25, and therefore, the distance T between the end most bobbin hanger 29 on adjacent carriage bars 25 is equal to the distance S between each two bobbin hangers 29 on the carriage bar 25. The width of the connecting piece 31e is the same as the width of the carriage bar 25. A protector 37 having a U, V or ⌐ shaped configuration is provided at both ends of the carrying means 24 and these end protectors 37 are placed on the outside of a full bobbin 7 hung on the endmost bobbin hanger 29, as shown by the plane view in FIG. 8, and the distance R between both ends thereof is longer that the diameter of a full bobbin 7. Note, these protectors 37 can be provided at the middle of the connecting piece 31e in such a way that two protectors 37 are provided facing in opposite directions at the same place.

In this invention, the number of hanging means used to transfer a set of articles may be varied depending upon the machine used, but because a roving machine is used in this example, the hanging means is a bobbin hanger and the number of the bobbin hangers is preferably equal to the number of spindles of a roving machine, or equal to half of that number. For example, if the number of spindles of a roving machine is 96, a carrying means 24 having a predetermined length may consist of 16 element portions 24a, as each carriage bar 25, i.e., the main portion of the element portion 24a, has six bobbin hangers 29 mounted thereon.

Next, a transferring rail according to this invention, which transfers the carrying means mentioned above, will be explained hereunder.

In this invention, a transfer rail per se basically consists of a first guide rail 67 provided between a lifting means and a machine provided on a floor as shown in FIG. 2A and 2B, and a second guide rail 83 provided between the lifting means and a machine provided on another floor as shown in FIGS. 4A and 4B, and a third, storing rail 56 provided in the lifting means as shown in FIG. 2A and 2B. Both the first and second guide rails 67 and 83 may further consist of a main rail, a branch rail, and a storage rail, for example, and the lifting means can additionally have at least a pair of waiting rails in the vicinity thereof.

The transfer rail of this invention will be explained in more detail with reference to the drawings.

In FIG. 2A, the embodiment in which a plurality of the element portions 24a divided from a carrying means 24 are stored in a lifting means is described. The first guide rail 67 having a cross section    , which is the same as that of a storing rail 56 described later, is provided between a position A of a roving machine and a position C of a lifting means for transferring a carrying means 24 and in the vicinity of the ceiling of floor 2 as shown in FIG. 1.

The guide rail 67 consists of a main rail 67a arranged between a position A at a roving machine 4 and a position C of a lifting means having a magazine, and a branch rail 67b shunted from the main rail 67a and arranged around each roving machine 4 and a reverse rail 67c arranged in parallel with the main rail 67a for a treatment of residual roving yarns on the roving bobbins by a roving stripper 68.

In FIG. 2A, one end of the main rail 67a close to a position C of a magazine of the lifting means is arranged at the position corresponding to a position whereat at least one end of the storing rail of the magazine is located when the magazine is positioned a certain location after stopping at each floor, and sometimes, moving out from the lifting means along a pair of waiting rails 48 on each floor, so that the end of the main rail 67a and the respective ends of the storing rails 56a can be joined, and each branch rail 67b is arranged so as to pass over a bobbin transferring means 9.

Figure 18:
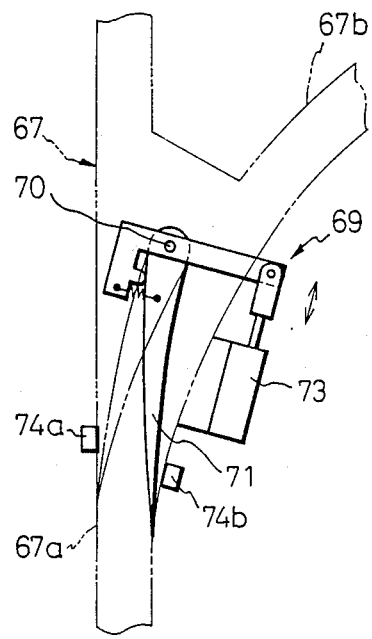
FIG. 18 is a plane view of a shunt means provided at a point of divergence of a main rail and a branch rail.

A shunt means 69 as shown in FIG. 18 is provided at each point of divergence of the main rail 67a and the branch rail 7b.

The shunt means 69 is provided with a shunting plate 71 movably mounted on an axis 70 and having an air cylinder 73, for transferring a carrying means selectively to the main rail 67a or the branch rail 67b. Limit switches 74a and 74b are provided thereon to confirm the switching operation thereof. A shunt means 75, which is the same as the shunt means 69 above, is provided at each point of divergence of the main rail 67a or main rail 67a and reverse rail 67c having an end located closer to a roving machine 4.

Figure 19:
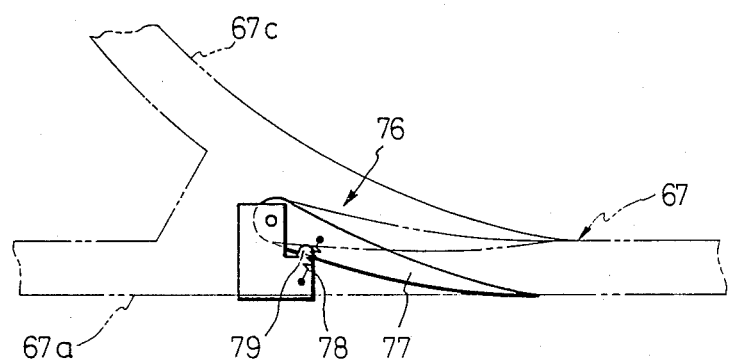
FIG. 19 is a plane view of a shunt means provided at a point of divergence of a main rail and a branch rail for a reverse transfer.

Further, at a diverging point which is located closer to a lifting means, of a main rail 67a and a reverse rail 67c, another shunting means 76 for guiding a carrying means 24 in only one direction is provided, and the shunting means 76 is provided with a shunting plate 77 movably mounted thereon and biased to come into contact with a stopper 79 by a spring 78, to guide the carrying means only to the reverse rail 67c, as shown in FIG. 19.

As shown in FIG. 2A, a plurality of driving means 80 having the same construction as that of a driving means 57 mentioned later, is provided along the guide rail 67 at a pitch shorter than the length of a carrying means having a predetermined length.

Figure 20:
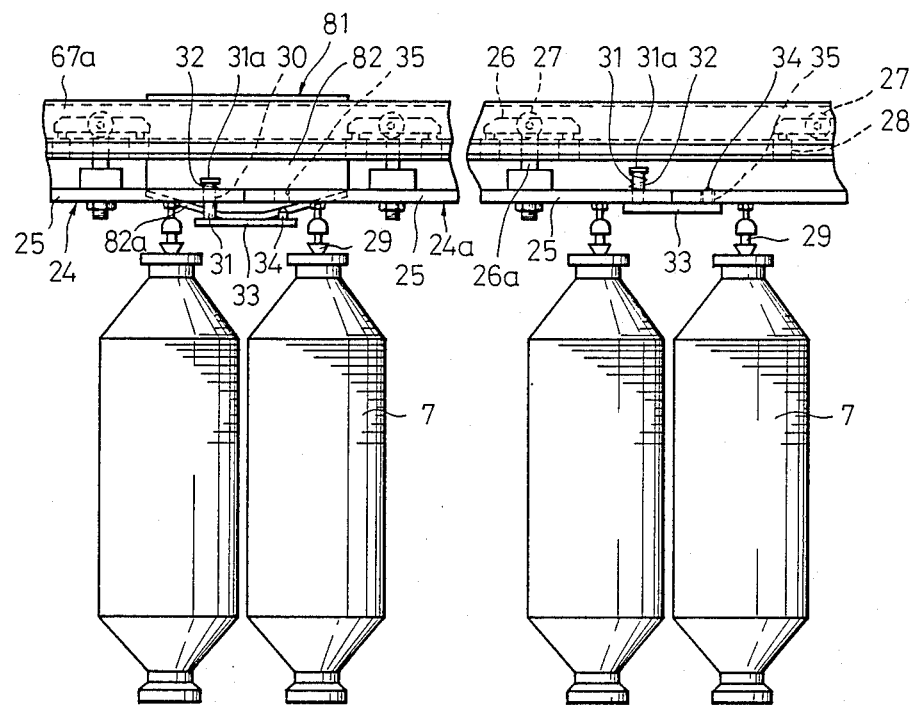
FIG. 20 is a plane view of a coupling and separating means of a carrying means, and a side view of a carrying means shown in FIGS. 6 and 7.
Figure 21:
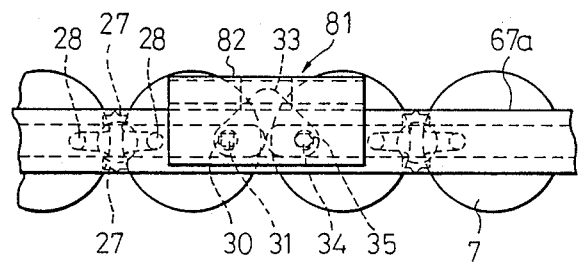
FIG. 21 is a plane view of a main portion of FIG. 20.

A coupling and separating means 81 for coupling and separating the element portions 24a of the carrying means 24 is also provided in the vicinity of an end of a main rail 67a, as shown in FIGS. 20 and 21.

The coupling and separating means 81 is provided with a cam plate 82, by which a connecting piece 33 of the carrying means 24 is pushed down, mounted on the guide rail 67 as shown in FIGS. 20 and 21.

In FIG. 2B, another embodiment in which the carrying means 24 is stored in a coiled configuration with a storing rail 56 provided in a magazine fixedly mounted on the lifting body, is disclosed, but the parts thereof are the same as in FIG. 2A except for the coupling and separating means 81.

In FIG. 2B, only one end of a main rail 67 facing a lifting means is shown, but a plurality of such ends may be provided when more than one magazine is used in the embodiment, as shown in FIG. 2A.

A second guide rail 83 having a □ cross section is provided in the proximity of the ceiling of floor 3, in the same manner as the guide rail 67, between a position B of a spinning machine and a position C of a lifting means 41, and consists of a main rail 83a arranged between a position B of a spinning machine 16 and a position C of a lifting means having a magazine, and a branch rail 83b is branched for the main rail 83a arranged around each spinning machine and a plurality of reserving rails 83c are arranged in parallel with the main rail 83a for reserving carrying means 24 as shown in FIGS. 4A and 4B. In FIG. 4A, one end of the main rail 83a facing a position C of a magazine of the lifting means is arranged at a position corresponding to a position whereat at least one end of the storing rail of the magazine is located when the magazine is positioned at a certain place after stopping at each floor and sometimes, moving out from the lifting means along a pair of waiting rails 48 on each floor, so that the end of the main rail 83a and the respective ends of the storing rails 56a can be joined, and a shunt means 84 having the same construction as the shunt means 69 as mentioned above at each diverging point consisting of the main rail 83a, of a main rail 83a and a branch rail 83b, and of a main rail 83a and a reserving rail 83c respectively. A plurality of driving means 85 having the same construction as that of the means 80 are provided along the guide rail 83 at a required distance, and a coupling and separating means 86 having the same construction as that of the means 81 is also provided in the vicinity of an end of a main rail 83a. An explanation of embodiments of a lifting means used in this invention will be given with reference to the drawings.

Figure 11:
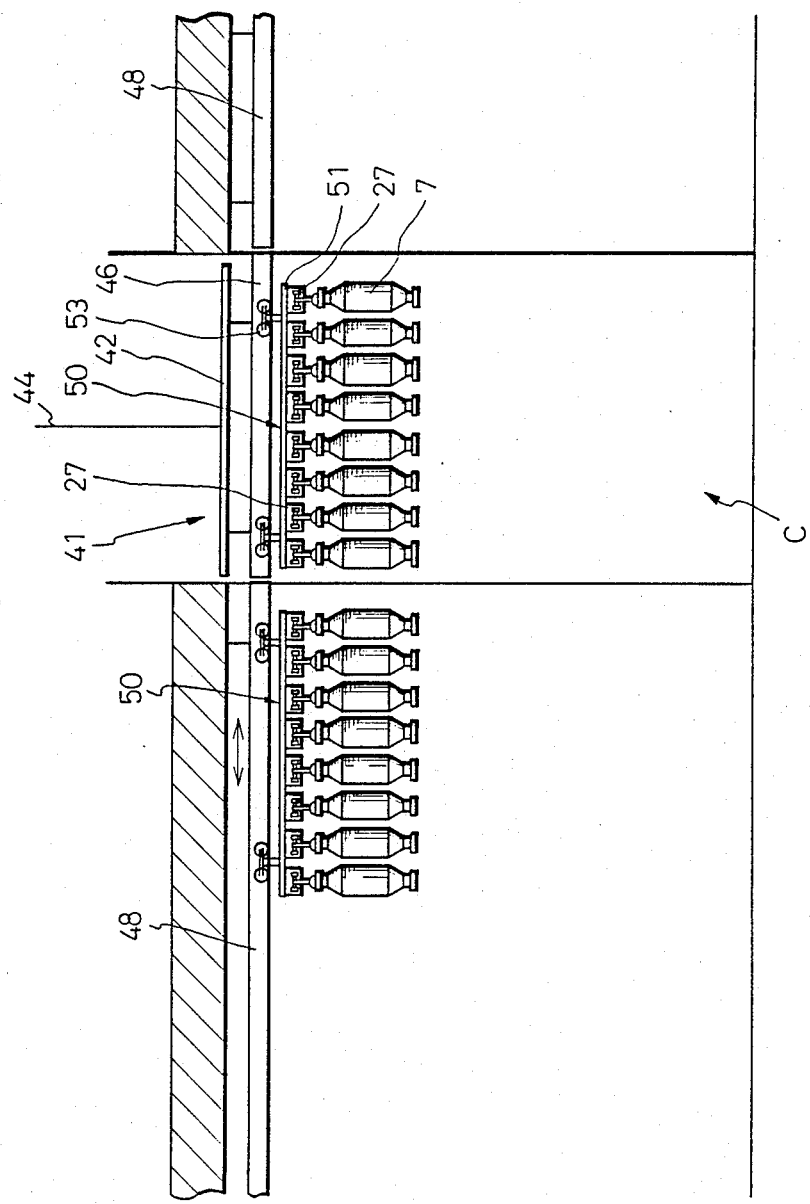
FIG. 11 is a vertical cross sectional view of a portion of a lifting means.

A lifting means 41 connecting the floors 2 and 3 of the building 1 is shown in FIGS. 1 and 11, and is provided with a lifting body 42 and a magazine 50.

The lifting body 42 is moved up and down between stopping positions corresponding to each floors 2 and 3, by a lifting device 43 consisted of a lifting motor 45 and a lifting provided in the vicinity of the ceiling as shown in FIG. 1.

The lifting means 41 may be an ordinary elevator generally utilized in a factory but also may be one specially designed for transferring bobbins.

In the lifting body 42, in the example shown in FIGS. 11 and 12, a pair of lifting rails 46 for supporting a magazine described later and guiding it in at least one horizontal direction, preferably two directions, is provided. These lifting rails 46 have the same cross section as that of the waiting rail 48 described above, and supporting rollers 53 of the magazine 50 provided on a top surface thereof are supported by the lower plate of the lifting rail 46, as shown in FIG. 13. A pair of racks 47 are also fixedly provided on the lifting body 42, arranged in parallel with the lifting rail 46 and having the same length as that of the rail 46. On the ceilings 2b and 3b of each floor 2 and 3, a pair of waiting rails 48 are fixedly provided in parallel on at least one side of the lifting means 41, preferably in two opposite directions as shown in FIGS. 1, 2A, 4A and 11.

The waiting rail 48 has the same construction as that of the lifting rail 46 and one end thereof is located at a position such that it is in contact with an end of the lifting rail 46 when the lifting body 42 stops at a predetermined position, thereby causing the waiting rail and the lifting rail to form a straight line so as to support the magazine and guide it in at least one horizontal direction. Moreover, as shown in FIGS. 12 and 13, on the ceilings 2b and 3b, a pair of racks 49 are fixedly provided in parallel to the waiting rail 48, and the end thereof can be connected to the end of the rack 47 to cause the racks 49 and 47 to form a straight line when the lifting body is stopped at a predetermined place, in the same manner as described above in relation to the waiting rail 48 and lifting rail 46.

The explanation of a magazine 50 provided in a lifting means 41, according to this invention will be given as follows.

The magazine 50 according to this invention is used for storing the carrying means 24 having full bobbins or empty bobbins hanging thereon, in various configurations, and for transferring the means 24 to each floor. The magazine 50 preferably moves out of and stops at a position apart from the lifting means 41, utilizing the waiting rail 48, after stopping at each floor, so that the carrying means can be moved into and out of the magazine 50 at that position.

Therefore, at least a storing rail 56 for storing the carrying means 24 is provided inside of the magazine and a driving means 85 for driving the carrying means 24 and a driving means for moving the magazine 50 are also provided, respectively.

Three magazines 50 in total may be used in the above embodiment, and therefore, at least an additional auxiliary magazine must be used when carrying out the respective operations of moving the carrying means into and out of the magazine 50 on each floor 2 and 3 and lifting the lifting means simultaneously or continuously. Note, if the number of floors is increased, then the number of the magazines should be increased by an increment of the floor number. For example, when the floor number is 5, then 6 magazines should be used. A detailed construction of the magazine 50 is shown in FIGS. 12 and 13, and as shown in Figures, the moving portion 51 of the magazine, having an H shaped configuration, is provided and four projected supporting rods 52 are also provided on the upper surface thereof.

Further, supporting rollers 53 are pivotally supported on the respective supporting rods 52 which are supported by the lifting rail 46, and a drive motor 54 able to rotate alternately in different directions is provided on the upper surface of the moving portion 51 of the magazine 50, and a pinion 55 thereof is mounted on an axis 54a of the motor 54 which can be coupled with the rack 47 and 49.

Further, at least one storing rail 56 is provided on a lower surface of the moving portion 51 of the magazine 50 which can store a carrying means 24 by guiding it along the rail horizontally. The storing rail 56 according to this invention is used to determine the storing configuration of a carrying means, having the bobbins 6 and 7 hanging thereon, inside the magazine.

Figure 12:
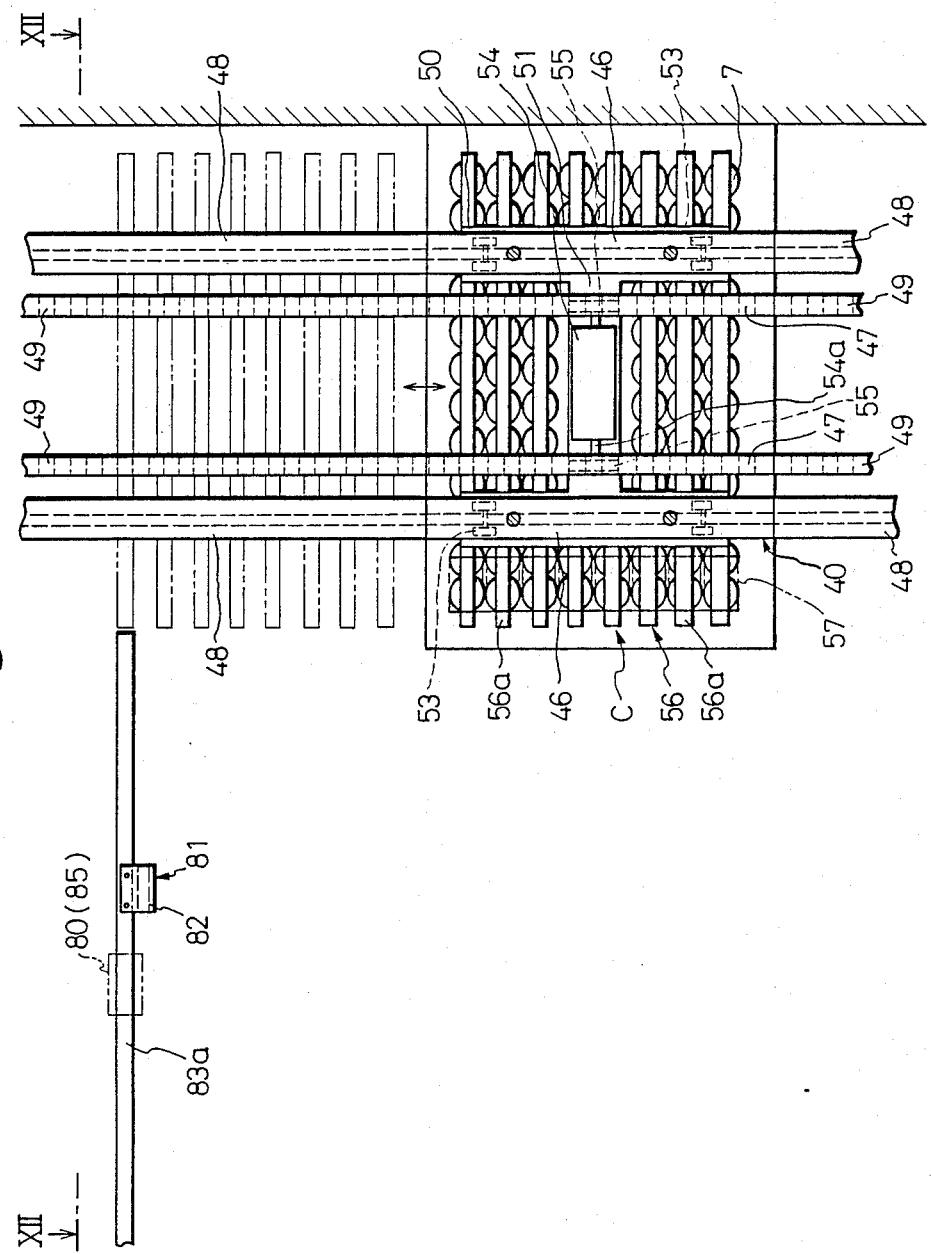
FIG. 12 is a plane view of a lifting means, showing the construction and function thereof when element portions of a carrying means are stored inside of a magazine in parallel.
Figure 13:
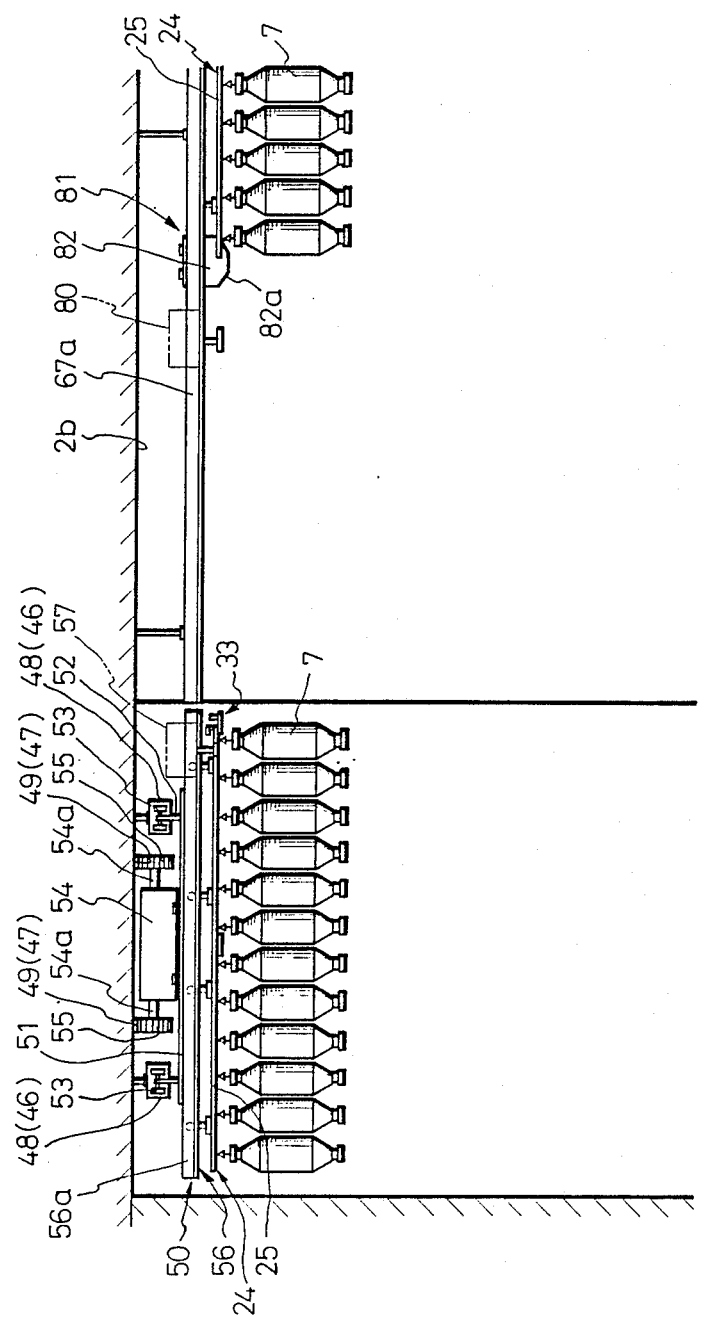
FIG. 13 is a cross sectional view taken along the line XII—XII in FIG. 12.
Figure 17:
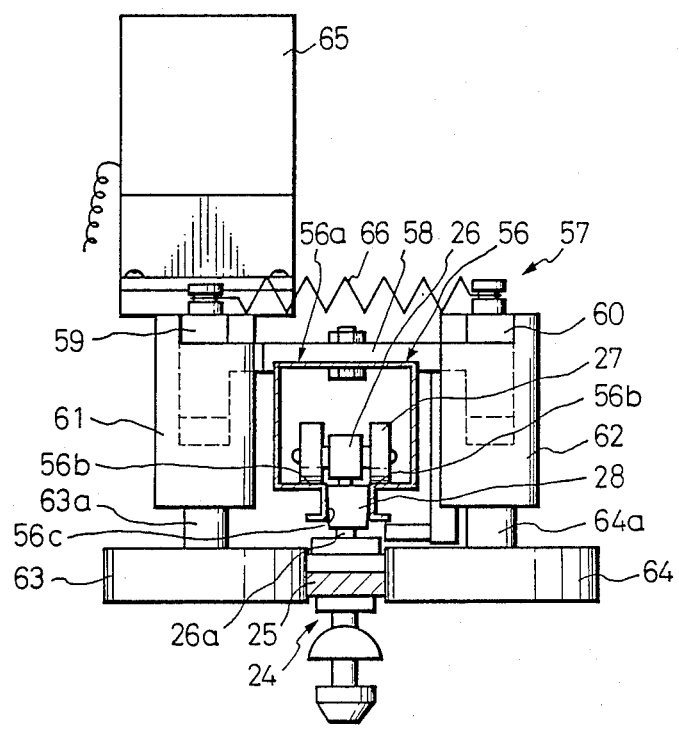
FIG. 17 is a cross sectional view taken along the line IX—IX in FIG. 16.

In the first embodiment, as shown in FIG. 12, a plurality of the elements of the storing rail 56a having a sufficient length for storing two successive element portions 24a of the carrying means 24 are provided in parallel in the same horizontal plane on the moving portion 51 so that a whole carrying means 24 having a predetermined length can be stored by the respective elements of the storing rails 56a, by dividing the carrying means into several portions. As shown in FIG. 17, the element of the storing rail 56a has a ⌐⌐ cross section and is provided with a pair of horizontal supporting surfaces 56b for guiding the supporting roller 27 of the carrying means 24 and a pair of vertical guiding surface 56c for guiding the guide roller 28.

Next, the drive means used in this embodiment will be explained.

Figure 16:
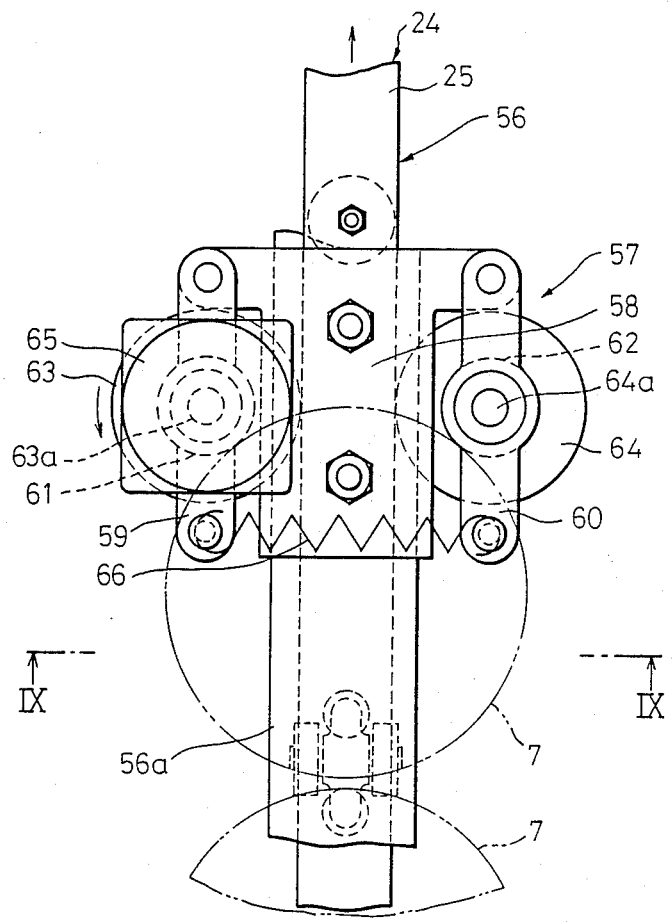
FIG. 16 is a plane view of a driving means.

A drive means 57 is provided on the element of the storing rail 56a, and as shown in FIGS. 16 and 17, a bracket 58, having swing arms 59 and 60 supported by bearings 61 and 62 respectively on each end thereof, is provided on the upper surface of the storing rail 56. The axis 63a and 64a of the drive roller 63 and 64 are mounted in the bearings 61 and 62 in a freely rotationable condition, and a motor 65 is mounted on the one of the bearings 61 to make the axis 63a rotate alternately in two directions.

A spring 66 is provided between the ends of the swing arms 59 and 60 to press the drive rollers 63 and 64 onto the carriage bar 25 of the carrying means 24 when the carriage bar 25 is inserted between the drive rollers 63 and 64.

The second embodiment of the storing rail 56 will be described hereunder.

Figure 14:
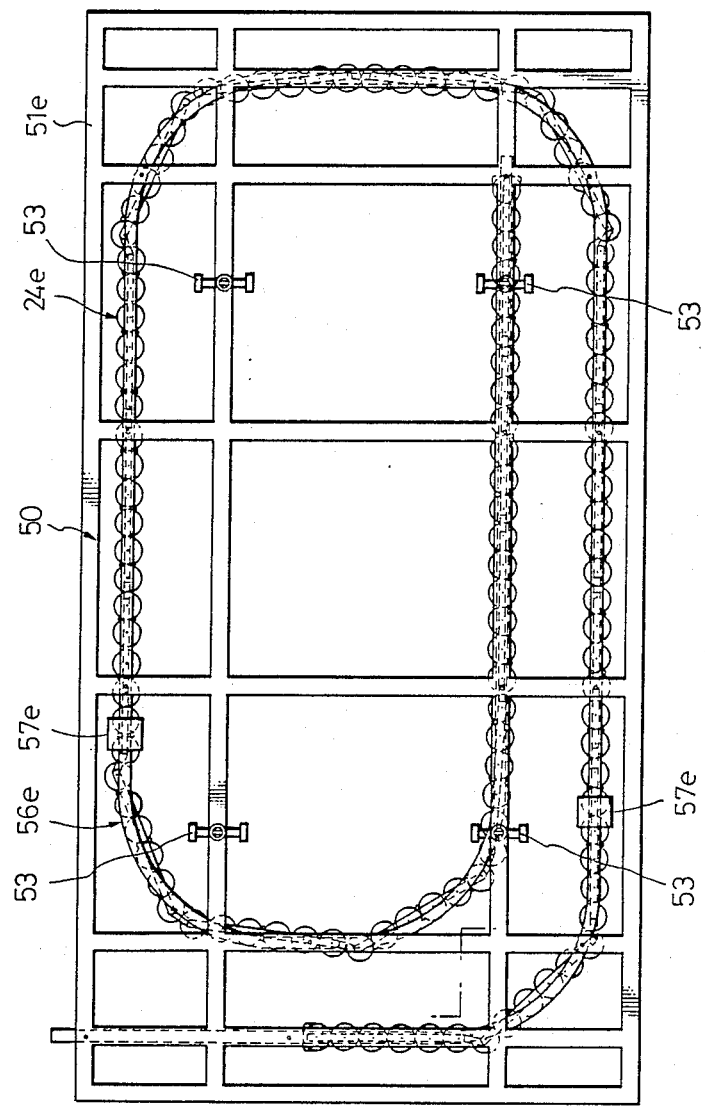
FIG. 14 is a plan view of a carrying means stored in a magazine in a coiled condition.

In this embodiment, as shown in FIG. 14, a storing rail 56e is fixedly provided on the lower surface of the moving portion 51e with a coiled configuration so that a carrying means 24e can be stored along the storing rail 56e without separating the carrying means 24e into the several element portions 24a thereof.

In this embodiment, the coupling and separating means used in the previous embodiment is not required and the storing operation can be carried out in a short time. In this embodiment, a drive means 57e having the same construction as that of the drive means 57 is provided on the storing rail 56e, as shown in FIG. 14.

Figure 24:
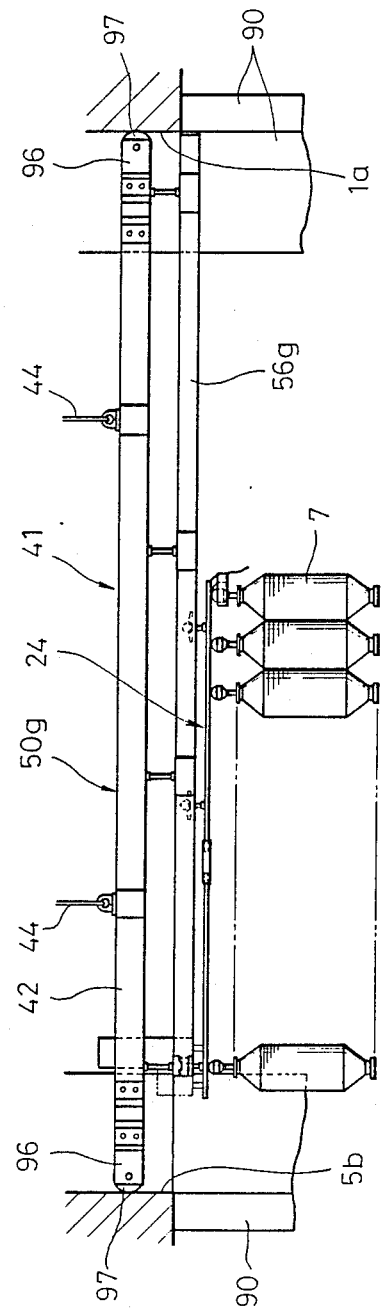

A different lifting means 41 according to this invention is explained with reference to FIGS. 23 and 24.

In this example, a magazine 50g is formed integrally with a lifting body 42, to provide the lifting means shown in FIGS. 2B and 4B. Note, this means that the magazine 50g has the same function as the lifting body 42. In the Figure, a storing rail 56g is arranged in a coiled configuration in the lifting body 42, in the same manner as the storing rail 56e shown in FIG. 14, and can guide the carrying means while still in a straight line into the magazine.

A bracket 96 having two guide rollers 97 rotatably mounted thereon is provided at each corner of the lifting body, and these guide rollers 97 are in contact with the vertical rail 90 provided at an inner surface of each corner of the shaft through which a lifting body passes between ground surfaces 2a, 3a and ceilings 2b, 3b.

The guide rollers 97 can enable a fine control of the positioning of the storing rail 56g of the carrying means 24, and further move the lifting body 42 smoothly when the lifting body 42 is moved up and down. Further, a detector for detecting the condition in which a carrying means has reached a predetermined storing position, not shown in this Figure, is provided at the open end of a storing rail 56g in the coiled configuration. The storing rail 56g is designed to be connected with the guide rail 67a in FIG. 2B and the guide rail 83a in FIG. 4B when the lifting body 42 is stopped at each floor 2 and 3 respectively.

A third embodiment of the storing rail will be described hereunder.

Figure 15:
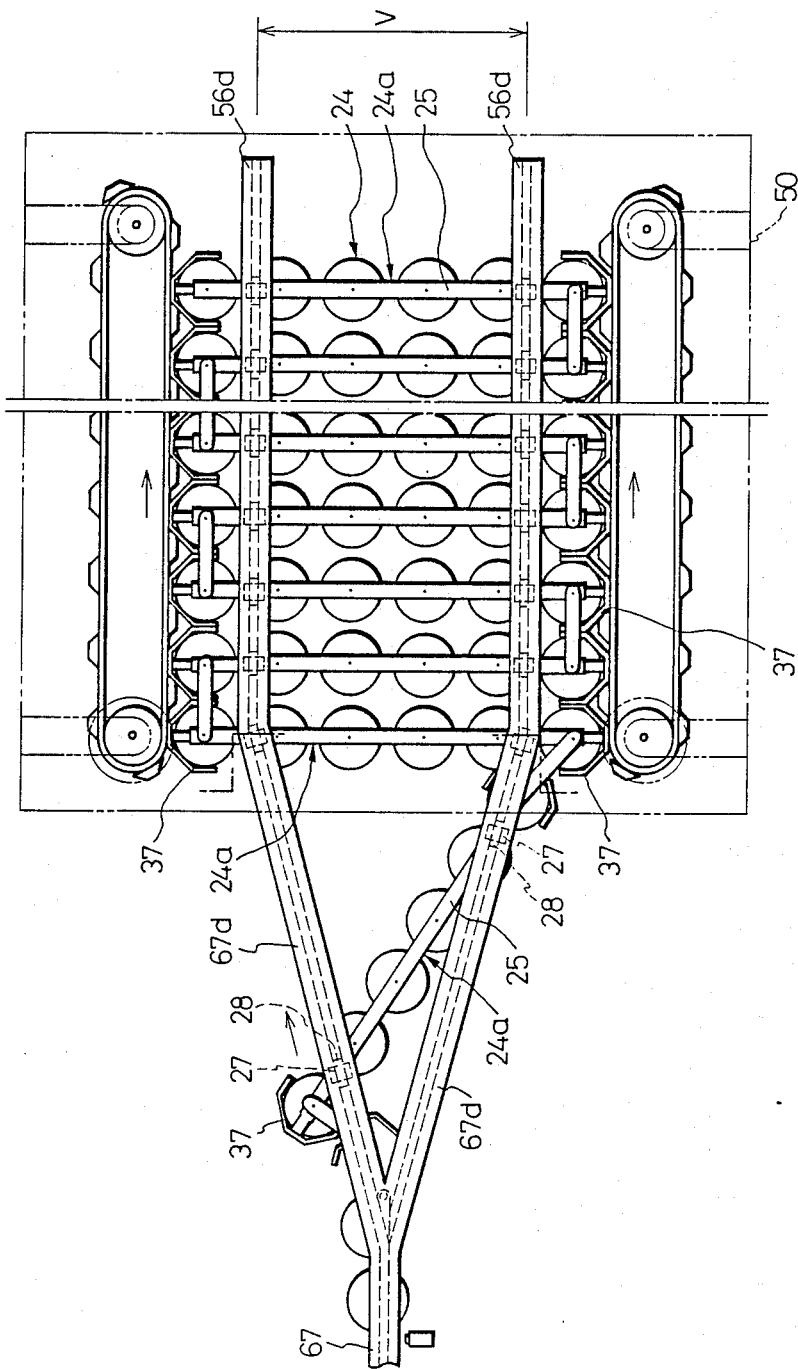
FIG. 15 is a plane view of a carrying means stored in a magazine in a folded condition.

In this embodiment, as shown in FIG. 15, two separate storing rails 56d are provided on a lower surface of a moving portion 51 of a magazine 50, arranged in parallel to each other, and each end thereof is connected to each end of a shunt rail 67d branched from a main rail 67.

In this embodiment, the distance V between the two rails 56d is equal to the length between two adjacent supporting bodies 26 mounted on the element portions 24a of a carrying means 24, to store the element portions 24a of the carrying means in a folding configuration in parallel in the same horizontal plane by guiding alternative adjacent supporting bodies 26 onto different storing rails 56d. Therefore, the element portions 24a of the carrying means 24 are stored at a right angle to the storing rail 56d, as shown in FIG. 15.

The transferring system using the first storing configuration as shown in FIGS. 2A and 4A, will be more precisely described with reference to the Figures.

When the full bobbins 7 doffed for a roving machine 4 are transferred to a position B of a spinning machine, a carrying means 24 is previously moved onto a shunt rail 67b corresponding to a roving machine 4 while the roving machine 4 is still operating. Then, when the operation of the roving machine 4 comes near to an end, empty bobbins hung on bobbin hangers 29 are taken up by an up and down movement of a lifting plate 14 and are placed in front of each bobbin wheel 4a after being inserted on a peg 10 provided on a belt conveyor 11 by a movement of a changing arm 15. When the roving machine 4 operation is finished, a head of an automatic bobbin changer 5 is moved to a bobbin wheel 4a for taking up a full bobbin 7 mounted on the bobbin wheel 4a and inserting it onto the peg 10 of the conveyor belt 11. After that the empty bobbins 6 mounted on the belt conveyor 11 are taken from the peg 10 of the belt conveyor 11 and inserted onto the bobbin wheel 4a by the automatic bobbin changer 5. Thereafter the roving machine again starts operation.

The full bobbins 7 mounted on the peg 10 are hung on the bobbin hangers 29 of a carrying means 24 guided to the roving machine along the shunt rail 67b through a bobbin transferring means 9. A motor of a drive means provided in the vicinity of the bobbin transferring means 9 is driven intermittently every time a full bobbin 7 is mounted on the bobbin hanger 29 so that the carrying means 24 is transferred by two pitches of the bobbin hangers 29 at each intermittent movement thereof.

When all the full bobbins 7 are hung on the bobbin hangers 29, the drive motor of the driving means 80 described previously, is started for rotating a pair of the drive rollers, in accordance with a signal from a suitable detecting means, and therefore, a carrying means 24 consisting of the carriage bars 25 is guided from the shunt rail 67b to the main rail 67a by the pair of drive rollers 63 and 64 and further, automatically guided to one position of a waiting rail 48 (for example, a portion above a lifting means 41 in FIG. 2A).

When the carrying means 24 is moved to the vicinity of one end of the waiting rail 48, the leading element portion 24a of the carrying means, i.e., the first element of the carrying means, is disconnected in such a way that the connecting piece 33 is lowered by the inclined surface 82a of the cam plate 82 so that the connecting pin 34 is detached from the connecting aperture 35 of the carriage bar 25, as shown in FIG. 20.

In such a condition, the drive means 80 located at the back of the cam plate 82 is temporarily stopped when the connecting piece 33 is lowered by the cam plate 82, such a condition is detected by a suitable detecotor (a proximity body).

Until the connecting piece 33 is lowered by the cam plate 82, the leading element portion 24a of the carrying means is moved into a space between the drive rollers 63 and 64 of the drive means 57 on the magazine 50 and stopped thereat.

Then the element 24a of the carrying means 24 is transferred to the element portions 56a of the storing rail 56 by operation of the drive motor 65 of the driving means 57. When a suitable detecting means has detected that the element portion 24a of the carrying means 24 is completely stored in the element portion 56a of the storing rail 56, then the drive motor 65 is stopped, and simultaneously, the drive motor 54 is temporarily started to rotate both the axis of the motor 54 and the pinion 55, to move the magazine 50 by one pitch of the element portion 56a of the storing rail 56.

Then, the operation of the drive means 80 is temporarily stopped, and then started again to separate the next element 24a of the carrying means 24, causing the connecting piece 33 to be lowered by the cam plate 82.

A repetition of this process, causes all of the elements 24a of the carrying means 24 to be stored on each element portion 56a of the storing rail 56, and then the lifting body 42 of the lifting means 41 is lowered to the next floor and brought to the stopped position, and the lifting rail 46 is connected to the waiting rail 48.

Figures 22E, 22F, 22G:
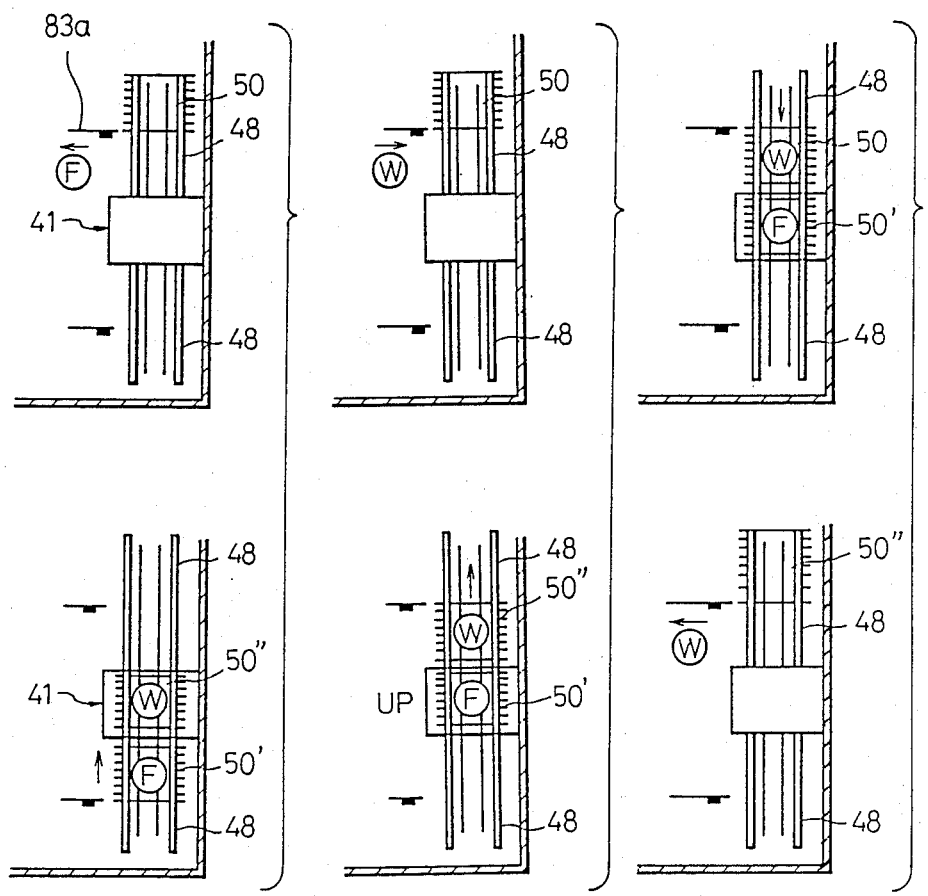
FIG. 22 illustrates the operation of a lifting means and a magazine.

The operation of the motor 54 of the magazine 50 is then started, and the magazine 50 is transferred from the waiting rail 48 to the lifting rail 46, at which point it is fully supported by the lifting rail 46, from (A) to (B) on the floor 2 as shown in FIG. 22.

Thereafter, when the magazine 50 is completely supported by the lifting rail 46, the driving motor 54 is stopped by a suitable detector and the lifting body 42 is then lifted up to the stop position at the floor 3, with the magazine 50, as from (B) to (C) on the floor 3 shown in FIG. 22. Meanwhile, on the floor 2, the other carrying means having the empty bobbins hung thereon is withdrawn from the other magazine 50' onto the main rail 67a. On the other hand, the lifting body 42 lifted to floor 3 is transferred to one vacant waiting rail 48 by starting the operation of the drive motor 54 again after connecting the lifting rail 46 to the waiting rail 48, from (C) to (D) on floor 3 as shown in FIG. 22.

Then, the motor 65 of the drive means 57 mounted on the element of the storing rail 56a of the magazine 50 is rotated in the reverse direction, to send the element portion 24a of the carrying means 24 onto the end of the main guide rail 83a of a guide rail 83, as shown in FIG. 4A, connected to the one of the ends of the element of the storing rail 56a.

When the connecting piece 33 is lowered by the cam plate 82 of the element 24a sent out of the storing rail 56a, by a coupling and separating means 86 provided at the end of the rail 83a, the element 24a is temporarily stopped in the same manner as on floor 2 as previously described. When the carrying mean 24 is completely moved onto to the main rail 83a, the drive motor 65 is stopped, and simultaneously, the drive motor 54 is temporarily operated to move the magazine 50 sideways by one pitch of the element of the storing rail 56a.

Then, the next element 24a of the carrying means 24 supported on the element of the storing rail 56a is moved onto the main rail 83a in the same way as above, and the end thereof is in contact with the end of the previous element 24a, and therefore these two elements 24a are moved together along the main rail 83a.

When the connecting piece 33 is raised by the spring 32 after the piece 33 is released from the cam plate 82, the elements 24a are connected together by the connecting pin 34 inserted into the connecting aperture 35.

When all of the elements 24a of the carrying means 24 are connected in a row by repetition of the above operation, the carrying means 24 is transferred to a position B at a spinning machine by the drive means 85.

In this case, the carrying means 24 can be transferred to the branch rail 83b, which is for the spinning machine 16 requiring the full bobbins 7, or when no requirement for the full bobbins 7 is sent from any of the spinning machines, it can be transferred to a reserving rail 83c, and thereafter, transferred from the reserving rail 83c to the branch rail 83b for a specific spinning machine 16.

As describd above, the system of this invention can be applied efficiently to the production of various kind of goods in small lots.

On the other hand, when the empty bobbins 6 are hung on bobbin hangers 29 of a carrying means 24 at one branch rail 83b of a spinning machine 16, the carrying means 24 is transferred to a position where the magazine 50 is held on the waiting rail 48, by steps opposite to the steps described above.

The carrying means 24 may be once stored on the reserving rail 83c in accordance with requirements, and thereafter, may be transferred to the magazine 50. As described above, when the operations from (A) to (C) on floor 2 in FIG. 22 are carried out, the carrying means 24 having empty bobbins 6 taken for a spinning machine 16 is stored in a separate magazine 50'', and is ready to move onto the lifting means 41 at floor 3, by the operation from (A) to (C) on floor 3 as shown in FIG. 22. The magazine 50'' is lowered to floor 2 after being moved onto the lifting rail 46 of the lifting means 41 as shown from (D) to (E) in floor 2 in FIG. 22, and a carrying means 24 having full bobbins 7 is withdrawn from the magazine 50 on floor 3 as shown from (D) to (E) on floor 3 in FIG. 22.

The magazine 50'' at floor 2 is transferred to the waiting rail 48, as mentioned above, and the operation of withdrawing a carrying means 24 having the empty bobbin 6 from the magazine 50'' is started. At the same time, another magazine 50' is moved onto the lifting rail 46 of the lifting means 41 and then lifted up to floor 3, as shown from (E) to (F) on floor 2 in FIG. 22.

While this operation is carried out on floor 2, the vacant magazine 50 is waiting on floor 3 in front of the lifting means 41.

In the second and the third storing configurations described above, the basic methods described above can be used, but is not necessary to divide the carrying means 24 into several elements 24a. Accordingly, in these embodiments, the operation of transferring the articles can be economically implemented at a high speed and with a high efficiency because all of the transferring operations, especially the storing operation, can be carried out continuously, and the more complicated process and apparatus of the first embodiment is not required.

In this invention, creel rails may be provided over the front and back of a bobbin hanger of a spinning machine, instead of the branch rail, and the bobbin hangers of a carrying means transferred onto the creel rail may be used as bobbin hangers on the creel. In this case, only one creel rail mentioned above is provided on one side of the spinning machine, with two parallel bobbin hangers carried on one carrying means 24.

As described above, in this invention, a bobbin carriage having full or empty bobbins hanging thereon can be easily stored in a magazine of a lifting means as a temporary storage means, while the bobbins still are hanging thereon, and also can be easily transferred to another floor in such a condition, and therefore, the quality of the roving bobbins will be increased by avoiding the damage to the surface of the roving bobbins usually suffered during transfer, and further, high degree of energy-saving is obtained from this invention because all of the bobbins can be transferred automatically and the manpower required for the operation of carrying bobbins or loading and unloading bobbins at a machine also will be reduced.

Further, according to this invention, waiting rails are provided on both sides of each stopping position of the lifting means at each floor, and several magazines having at least one storing rail are provided in such a way that each magazine can move along a lifting rail provided on a lifting body of a lifting means and the waiting rail so that, when one magazine is moved onto one of the waiting rails from the lifting rail, another magazine is moved thereafter or simultaneously onto the lifting rail in the lifting means.

Accordingly, the bobbin transferring capacity of the magazine of the lifting means can be greatly increased and the installation costs are reduced because of the reduction of the number of lifting means.

We claim:

1. A method for transporting articles in a system for transferring said articles between different machines provided on different floors of a building respectively, wherein the method comprises, taking a predetermined number of articles from a machine provided on a floor, hanging said articles in a series of rows on a carrying means having a predetermined length and moving along a guide rail provided in the proximity of said machine, taking said articles to a lifting means by moving said carrying means along said guide rail, storing said articles in the lifting means in such a way that at least one portion of the carrying means is arranged with at least one other portion of the carrying means in a side by side configuration while said articles are still hanging on the carrying means, transferring the articles to another floor by a lifting means, withdrawing the articles from the lifting means in a series of rows while said articles are still hanging on the carrying means, onto a guide rail, and supplying said articles to another machine by moving the carrying means along the guide rail.

2. A method according to claim 1, wherein the different machines provided on different floors are roving machines and spinning machines.

3. A method according to claim 1, wherein said articles are bobbins.

4. A method according to claim 1, wherein the carrying means is stored in the lifting means in a coiled configuration.

5. A method according to claim 1, wherein the carrying means is stored in the lifting means in a folded configuration.

6. A method according to claim 1, wherein the carrying means consists of a plurality of carriage elements, and is stored in the lifting means in a configuration such that the plurality of carriage elements are separated from the carrying means as a whole and are arranged in parallel to each other.

7. A method according to claim 1, wherein a magazine having at least a storing rail which stores the carrying means therein is provided inside of the lifting means.

8. A method according to claim 7, wherein the magazine is fixedly mounted on the lifting means.

9. A method according to claim 7, wherein the magazine can move in at least one horizontal direction at a stopping position at each floor to be able to move out of the lifting means.

10. A method according to claim 8, wherein the magazine can move in two horizontal directions.

11. A method according to claims 9 and 10, wherein the carrying means are moved into and out of the magazine at a place where the magazine is moved out of the lifting means.

12. A method according to claim 7, wherein a number of magazines used is equal to a number of floors plus 1.

13. A method according to claim 3, wherein on each floor, an operation of carrying full bobbins away from a magazine and an operation of carrying empty bobbins therein, and an operation of carrying empty bobbins away from the magazine and an operation of carrying full bobbins therein, are carried out respectively at each floor, and two different operations are carried out by a program selected for carrying out said operations simultaneously and in sequence.

14. A method according to claim 3, wherein the number of bobbins is equal to the number selected from a spindle of a roving machine.

15. An apparatus for transporting articles in a system for transferring said articles between different machines provided on different floors of a building, which comprises at least a lifting means connecting one floor to another floor, and having at least a storing rail therein, a guide rail is provided at the lifting means and at the machinery on each floor, at least one carrying means for the articles, having a predetermined length and said carrying means moving back and forth between the machines and the lifting means along the guide rail and the storing rail, and further comprises, moving said carrying means with a predetermined number of articles required by the machine while said articles are hanging thereon, in a series of rows on the guide rail while storing the carrying means in the lifting means in such a way that at least one portion of the carrying means is arranged with at least another portion of the carrying means in a side by side configuration while said articles are still hanging thereon, and transferring the articles back and forth among the machines provided on the different floors.

16. An apparatus according to claim 15, wherein the different machines from each other provided on different floors are roving machines and spinning machines respectively.

17. An apparatus according to claim 15, wherein the carrying means is provided with a means for hanging the articles thereon.

18. An apparatus according to claim 15, wherein the carrying means has a linear configuration extending in a longitudinal direction.

19. An apparatus according to claim 18, wherein the carrying means consists of a plurality of elements of the carrying means and each end of one element of the carrying means is removably connected to an end of another element.

20. An apparatus according to claim 18, wherein the carrying means consists of a plurality of the elements of the carrying means and each end of one element of the carrying means is pivotably connected to another element at the ends thereof.

21. An apparatus according to claim 19 or 20, wherein the elements of the carrying means are provided with a plurality of means for hanging the articles thereon.

22. An apparatus according to claim 15, wherein the lifting means further comprises a lifting body and a magazine capable of moving up and down with the lifting body and having at least a storing rail for storing the carrying means therein.

23. An apparatus according to claim 22, wherein the lifting body and the magazine are integrally formed as one body.

24. An apparatus according to claim 22 or 23, wherein a storing rail provided inside of the a magazine has a coiled configuration, to enable the carrying means to be stored in a coiled condition in the magazine.

25. An apparatus according to claim 22 or 23, wherein two finite storing rails are provided in parallel with each other in the magazine for storing the carrying means in a folded condition, to enable the elements of the carrying means to be arranged at a right angle to the storing rail.

26. An apparatus according to claim 22 or 23, wherein a plurality of finite storing rails are provided in parallel with each other in the magazine for storing each element divided from the carrying means on each storing rail, respectively, to enable the elements of the carrying means to be stored therein in parallel to each other.

27. An apparatus according to claim 15, wherein the guide rail is provided in a proximity of a ceiling of each floor.

28. An apparatus according to claim 22, wherein the magazine is slidably connected to the lifting body by a lifting rail fixed to the lifting body and at least one supporting roller provided on the magazine is coupled therewith, and at least one pair of waiting rails are provided in the proximity of a ceiling of each floor and the position of one end of each waiting rail corresponds to a position of one end of the lifting rail in the lifting body, so that the magazine can move in at least one horizontal direction out of the lifting means when the lifting means stops at each floor.

29. An apparatus according to claim 28, wherein at least a rack is provided on both the lifting body and in a proximity of the ceiling of each floor and a drive means with at least a pinion is provided on the magazine and said pinion and said rack are coupled with each other to enable the magazine to move by itself.

30. An apparatus according to claim 28, wherein a position of at least one end of a guide rail provided on each floor corresponds to a position of at least one end of a storing rail of the magazine when the magazine is moved out the lifting means after the lifting means has stopped at each floor.

31. An apparatus according to claim 15, wherein a transfer of the carrying means is provided by at least one drive means mounted on the guide rail and the storing rail.

32. An apparatus according to claim 15, wherein an automatic bobbin transferring means is provided between the guide rail and the roving machine or the spinning machine.

33. An apparatus according to claim 17, wherein the bobbin hanging means provided on the carrying means is pivotable and has a mechanism such that a bobbin can be coupled with and removed from the hanging means by lifting upward from the bottom of said means.

* * * * *